C. C. HANSEN.
THROTTLE VALVE FOR ROCK DRILLING ENGINES.
APPLICATION FILED FEB. 11, 1916.
1,201,724.  Patented Oct. 17, 1916.
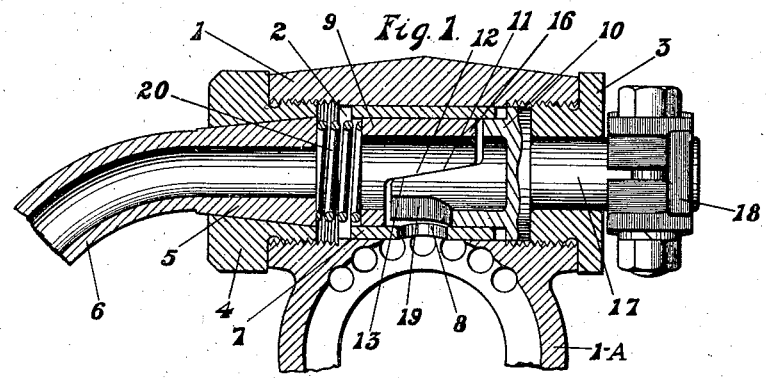
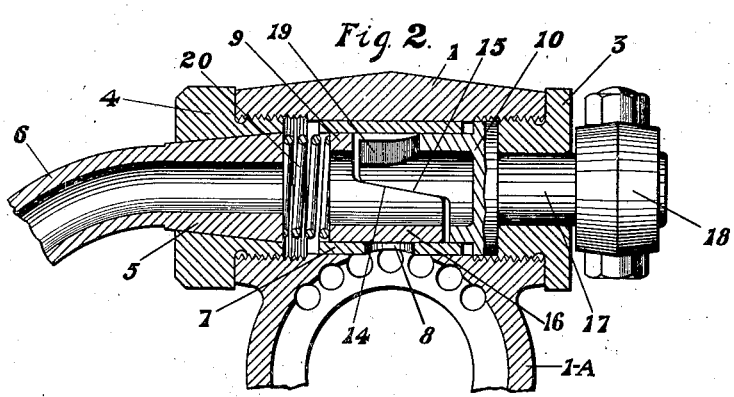
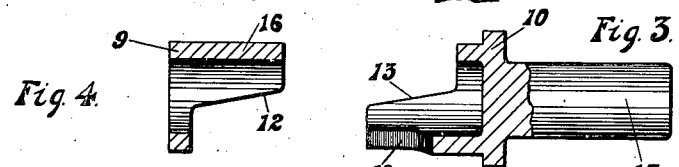
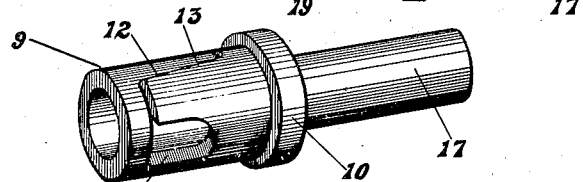
INVENTOR
Charles C. Hansen
BY
ATTORNEY

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

THROTTLE-VALVE FOR ROCK-DRILLING ENGINES.

1,201,724.   Specification of Letters Patent.   Patented Oct. 17, 1916.

Application filed February 11, 1916. Serial No. 77,547.

*To all whom it may concern:*

Be it known that I, CHARLES C. HANSEN, a citizen of the United States, residing at Easton, in the county of Northampton and State of Pennsylvania, have invented a certain new and useful Improvement in Throttle-Valves for Rock-Drilling Engines, of which the following is a specification.

This invention relates to throttle valves and more particularly to throttle valves for rock drilling engines, such as shown in the patent to John George Leyner, Number 1,039,972, granted October 1st, 1912.

Throttle valves of the type shown in the above mentioned patent have been found to have several disadvantages in actual practice, one of the chief of these being that it is possible with a valve of such a construction to place the air inlet but on one side of the drill, it being impossible when desired to change this air inlet from one side to the other, as is frequently desirable on account of the position of the drill when working.

The object of the present invention is to provide a simple throttle valve which will have the advantages of tightness and adjustment to wear found in valves of the tapering plug type, and which, at the same time, can be reversed so that the air inlet can be placed on either side of the drill, if desired, without in any way affecting the operation of the valve.

These objects are attained by the present invention, a practical embodiment of which is shown in the accompanying drawings, in which—

Figures 1 and 2 show vertical longitudinal sections through the valve casing with the valve respectively in open and closed positions; Figs. 3 and 4, similar sections through the two parts of the valve proper; and Fig. 5, a perspective view of the valve proper, showing the parts in operative relation.

In the drawings, the valve is shown in connection with a rock drill, although it is adapted for use in any machine where such a valve is desirable, and comprises a valve casing 1 set transversely on the cylinder 1ᵃ of a rock drill, the details of which form no part of this present invention, and are not necessary to the understanding thereof. The valve casing 1 is provided with a cylindrical bore 2 extending from one side to the other thereof, the ends of which are interiorly threaded. Into one end of the bore 2 is threaded a nut 3, and into the other end is threaded a nut 4. These nuts are interchangeable and can be threaded into either end of the bore. The nut 4 is provided with an outwardly tapering bore in which is rotatably mounted the similarly tapered portion 5 of an inlet pipe 6 which carries the air or other operating fluid into the end of the valve bore 2. In the center of the bore 2 is a cylindrical liner 7 through the lower side of which a discharge port 8 leads into the interior of the drill cylinder 1ᵃ. Rotatably mounted in the bore 2 and partially inside of the liner 7, is the valve proper, which consists of two parts, 9 and 10, these parts together forming a practically continuous tubular member, but being separated by a cut 11 which follows a line extending first perpendicularly to the axis of the tubular member nearly to the center thereof, then longitudinally at an angle to the axis of the tubular member to a point on the other side of the center, and then perpendicularly to the axis to the surface of the tubular member on the other side, thus providing the two parts of the tubular member with contacting sliding surfaces 12—13 and 14—15, so arranged that when the two parts of the valve 9 and 10 are pushed together by means of the spring 20, the part 9 which is free will be pushed toward the inner surface of the liner 7, the longer side of the part 9 forming a covering portion 16 which closes the port 8 when the valve is in the position shown in Fig. 2. The part 10 of the valve serves as a turning element and is provided with a stem 17 which is rotatably mounted in the nut 3, and projects through the nut 3 on its outer side to receive a turning handle 18. The longer side of the valve portion 10 inside of the bore 2 is cut away, forming an opening 19 which registers with the port 8 when the valve is in the position shown in Fig. 1 and allows the fluid from the pipe 6 to pass through the port 8 into the drill cylinder 1ᵃ. Between the adjacent ends of the valve part 9 and the tapering portion 5 of the inlet pipe 6 is placed a coiled spring 20, which tends to force at all times the valve part 9 toward the part 10, and consequently, by reason of the contacting surfaces 12—13 and 14—15 tends to force the covering portion 16 toward the inner surface of the liner 7. The spring 20 likewise assists the pressure of the air in holding the pipe 6 in its outermost position, as shown.

The operation of the valve will be evident from the above description. When the valve is in the position shown in Fig. 1, opening 19 and port 8 are registering, allowing the fluid to pass from the interior of the valve bore to the interior of the drill cylinder 1ª. When the valve is turned to the position shown in Fig. 2 the covering portion 16 of the valve part 9 will close the port 8, and through the pressure of the spring 20 which tends at all times to move it longitudinally toward the part 10, will be forced by the action of the sliding surfaces 12—13 and 14—15 tightly against the lower side of the liner 7 against port 8 so that leakage of air is practically eliminated. The effect of any wear is also eliminated by this construction, since as it wears the part 9 will move a little farther up on the part 10 and retain its tight contact against port 8.

It is to be understood that the present showing and description discloses only one specified modification of this invention and other forms and modifications are included within the spirit and scope of the same, as expressed in the appended claims.

What I claim is:

1. In a throttle valve, a casing having a cylindrical valve bore, an inlet conduit leading into one end of the bore, a discharge port from the side of the bore, a longitudinally movable plug in said bore having a portion covering said discharge port in one position, a manually operable turning element for said plug, said plug and turning element having slanting surfaces contacting and arranged to force the port covering portion of said plug toward the inner surface of said valve bore by longitudinal movement of said plug in one direction and means to move said plug longitudinally in said direction.

2. In a throttle valve, a casing having a cylindrical valve bore, an inlet conduit leading into one end of the bore, a discharge port from the side of the bore, a longitudinally movable tubular plug in said bore having a portion covering said discharge port in one position, a manually operable turning element for said plug, said plug and turning element having slanting surfaces contacting and arranged to force the port covering portion of said plug toward the inner surface of said valve bore by longitudinal movement of said plug in one direction and resilient means to move said plug longitudinally in said direction.

3. In a throttle valve, a casing having a cylindrical valve bore, an inlet conduit leading into one end of the bore, a discharge port leading from the side of said bore, a tubular valve rotatably mounted in said bore, said valve being divided into two parts by a cut, a portion of which runs longitudinally at an angle to the axis of said valve, one of said parts having a rotating handle thereon and an opening therein adapted to register with said discharge port in one position of the valve and the other of said parts being free to move longitudinally in said bore and having a portion adapted to cover said discharge port in another position of the valve and means to move said free part in a direction to force its covering portion toward the inner surface of said bore.

4. In a throttle valve, a casing having a cylindrical valve bore, nuts securable interchangeably in either end of said bore, a valve turning element in said bore having a stem rotatably mounted in one of said nuts and projecting outwardly thereof to receive a rotating handle, an inlet pipe mounted in the other of said nuts, a discharge port in the side of said valve bore, and a tubular valve plug having a covering portion for closing said discharge opening, means to turn said plug from said turning element, and means to force the covering portion of said plug against said discharge port when in closing position.

In testimony whereof, I have hereunto set my hand.

CHARLES C. HANSEN.

Witnesses:
R. J. DAY,
JOHN F. MOCK.